B. G. LAMME.
WINDING FOR DYNAMO ELECTRIC MACHINES.
APPLICATION FILED JAN. 26, 1910.
1,070,492.
Patented Aug. 19, 1913.
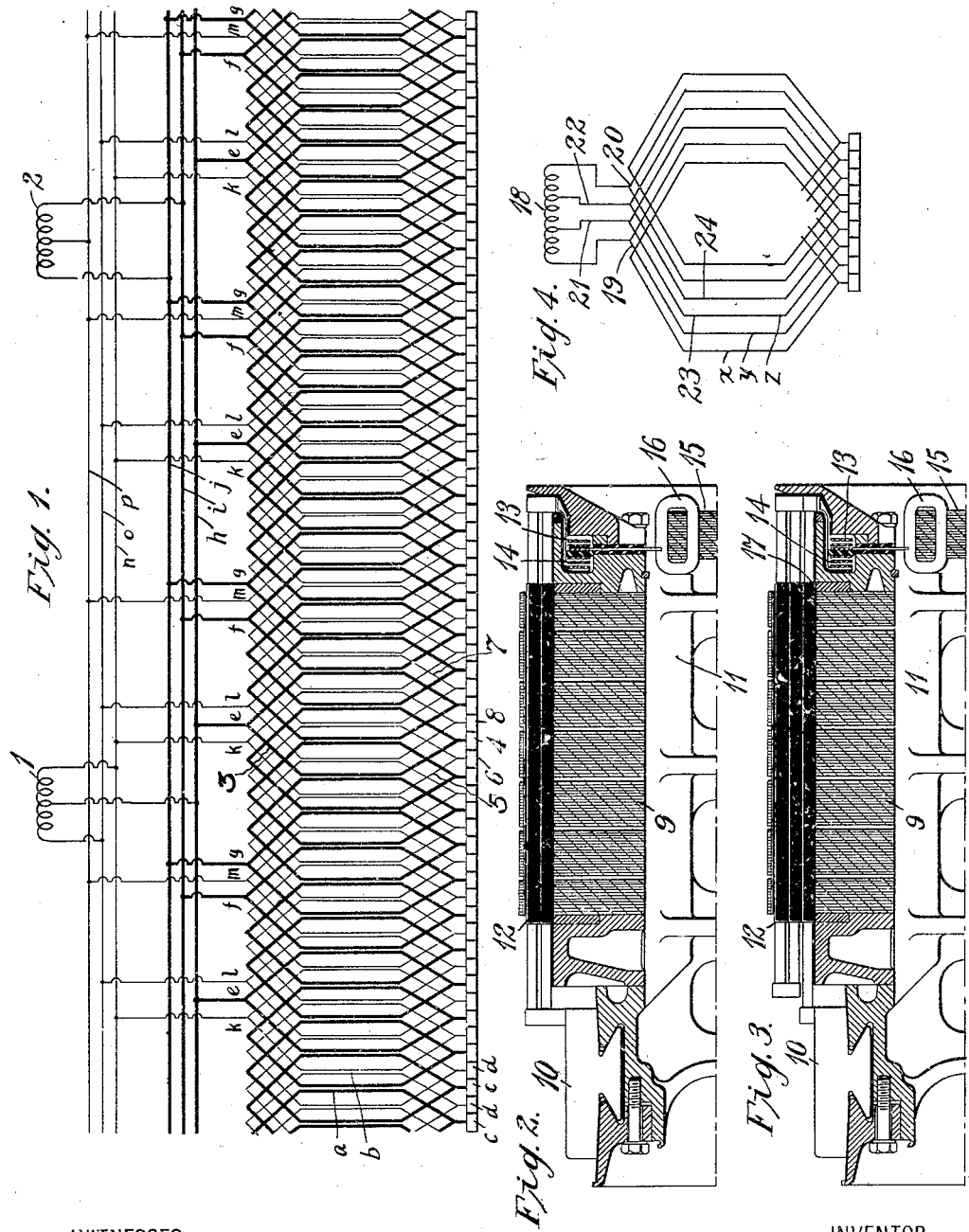

ced COPY

UNITED STATES PATENT OFFICE.

BENJAMIN G. LAMME, OF PITTSBURGH, PENNSYLVANIA, ASSIGNOR TO WESTING-HOUSE ELECTRIC AND MANUFACTURING COMPANY, A CORPORATION OF PENNSYLVANIA.

WINDING FOR DYNAMO-ELECTRIC MACHINES.

1,070,492.  Specification of Letters Patent.  Patented Aug. 19, 1913.

Application filed January 26, 1910. Serial No. 540,190.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Winding for Dynamo-Electric Machines, of which the following is a specification.

My invention relates to windings for dynamo-electric machines and particularly to armature windings for machines of the commutator type.

The object of my invention is to provide a plural winding that shall be specially adapted for high-speed direct current machines and for single-phase alternating current machines, and a simple and effective means for maintaining a predetermined potential relation between the parts in order that the voltage between any two adjacent commutator bars may be relatively low and equal to the voltage between any other pair of adjacent bars without introducing undesirable features.

In the construction of parallel-wound armatures for machines of the commutator type, the usual practice is to use one or more turns per coil or per armature bar, a single turn per bar being most common. In some cases, the number of commutator bars between adjacent neutral points is very small, even when a single turn per bar is employed in the winding.

On ordinary direct current machines, this difficulty is usually overcome by increasing the number of poles which results in a decrease in the induction per pole, and, consequently, at any predetermined speed, the number of conductors between adjacent neutral points and the number of commutator bars may be increased. When the number of poles is thus increased, the detrimental effect to be expected on account of the decrease in induction per pole is compensated for by a corresponding diminution of the current to be commutated.

The difficulty referred to above is, however, more frequently encountered with direct current turbo-generators and other high-speed machines and in single-phase motors of the commutator type where it is not so easily overcome. It is impracticable to increase the number of poles on very high speed machines, because the frequency of the machine, which is equal to the product of the speed, in revolutions, by the number of poles, becomes very high and the iron loss becomes abnormally great. Furthermore, with a fixed angular velocity, if the number of field poles is increased either the diameter of the commutator and the peripheral speed of the commutator must be increased or the distance between adjacent neutral points must be reduced.

It is evident that it will usually be found desirable to reduce the number of poles for high-speed machines and to reduce the voltage between adjacent commutator bars by some other means. This result may be accomplished by using any one of several well-known armature windings, but, in each case, some new difficulty is encountered or some disadvantage is introduced. For example; ring windings could be employed, since one-half of every turn is inactive and, consequently, if a commutator bar is provided for each turn, the voltage between bars would be materially reduced, but ring windings have not proved satisfactory from the standpoint of commutation. Two of the usual parallel windings of the drum type may be placed side by side on the same armature core and connected to alternate commutator bars, but, when this is done, it is necessary to provide some means for maintaining a proper potential relation between the two windings. This has been heretofore accomplished by attaching connections or leads to one winding at the commutator end of the core member and to corresponding points in the other winding at the opposite end of the core member, these leads passing within the core ring so that they will not cut the field flux when the machine is in operation.

According to still another arrangement, a single parallel winding is employed with twice as many commutator bars as there are turns, every other bar being connected to intermediate points in the coils by means of leads which are carried from the rear end through the core ring to the commutator bars. By this means, there is only one-half turn between adjacent commutator bars, and, consequently, the voltage between the bars is halved. It is frequently very undesirable, however, to carry leads or connections of any kind through the armature core ring, especially in high-speed machines where the conductors on the moving parts must be very rigidly supported. These constructions would therefore be undesirable for railway motors where very high armature speeds are often reached.

Since the magnetic field is alternating in single phase commutator type machines, there is considerable voltage generated in each turn of the armature winding by reason of transformer action alone. This voltage is maximum when the armature is at a standstill, and in the turns which entirely surround the magnetic field. Unfortunately, one or more of these turns is short-circuited by the brushes, and, in order to reduce the currents which are induced in these short-circuited turns, it is usual to introduce resistance between the armature turns and the commutator bars. The resistance of the brushes also aids in suppressing these currents. Even when resistance leads are employed, the permissible induction per pole is limited to a predetermined value, and, consequently, in order to obtain a desired torque, either the current or the number of armature conductors, or both, must be adjusted accordingly. The number of armature conductors is usually limited for mechanical reasons, and, therefore, an increased current is usually necessary. For low speed motors of large capacity, the current may be so large that the number of poles must be made relatively large in order to keep the current per brush within reasonable limits, but the size of the motor will usually be limited on account of the space which it is to occupy, and, consequently, there is a limit to the number of poles which are commercially practicable. In small motors for low frequencies, the above-mentioned conditions may be met without difficulty, but, in motors of very large capacities, it is not unusual to find cases where, even with low frequencies, it is still difficult to obtain the desired output without obtaining an abnormally high induction per pole and excessive short-circuit voltage which limits the design in the same way that the voltage between bars limits the design of high-speed direct current machines.

It is evident that, if the objection to the half-turn arrangement above referred to, viz., the passing of leads or connectors through the core ring can be avoided, the design of single phase commutator type machines may be greatly facilitated, since, with only one active conductor between adjacent commutator bars, the induction per pole can be doubled without increasing the short-circuit voltage which would otherwise be obtained. If it is not desirable or necessary to increase the induction per pole, the voltage between bars may be so far reduced as to render the use of resistance leads unnecessary.

According to my present invention, I provide means for maintaining a predetermined voltage-relation between the parts of a plural winding without the use of connections through the armature core and which permits not only the use of two commutator bars per turn, but of three or more commutator bars per turn, as desired.

Figure 1 of the accompanying drawings is a diagrammatic development of an armature winding embodying my invention. Fig. 2 is a longitudinal section of an armature equipped with the winding of Fig. 1. Fig. 3 is a view similar to Fig. 2 of an armature having high-resistance leads between the winding and the commutator bars, and Fig. 4 is a diagrammatic view, corresponding to Fig. 1, in which three commutator bars per turn are provided.

Referring to Fig. 1 of the drawings, two parallel windings $a$ and $b$ are interlaced mechanically so that they are connected to alternate commutator bars $c$ and $d$. For the sake of clearness, the coils of winding $a$ are illustrated by heavy lines and the coils of the winding $b$ by light lines. A plurality of equi-potential points $e$, $f$ and $g$ are respectively connected to conductors $h$, $i$ and $j$, and equi-potential points $k$, $l$ and $m$ are connected to conductors $n$, $o$ and $p$. The two windings $a$ and $b$ are so spaced and located that the voltage between any two adjacent bars $c$ and $d$ is equal to the voltage between any other two adjacent bars. It is well known, however, that there are many factors which tend to disturb the relation between them and, consequently, I have provided transformers 1 and 2 in order that the proper voltage relations may be maintained in operation.

The terminals of the transformer 1 are connected, respectively, to the conductors $n$ and $o$ and its middle point is connected to the conductor $h$. The transformer 2 is similarly connected across the conductors $i$ and $j$ and its middle point is connected to the conductor $p$. The joint capacity of the transformers is small relative to the capacity of the armature, and it is evident that a single transformer may be utilized or that several may be used, according to the requirements of any given case. It will be observed that the middle point of the transformer 1 is connected, through conductor $h$ and one side of the coil 3 of the windings $a$, to the commutator bar 4 of the group $c$. One terminal of the transformer is connected, through conductor $n$ and one side of a coil 5 of the winding $b$, to commutator bar 6, and the other terminal of the transformer is connected, through conductor $o$ and one side of the coil 7, to commutator bar 8. The commutator bars 6, 4 and 8 are consecutive, the bar 4 being between the bars 6 and 8, and since each of the bars is separated from the point of connection to the transformer by a half turn, the voltage ratio between two halves of the transformer winding will correspond to the voltage ratio between the bars, consequently, by tapping the transformer winding at its middle point, the desired voltage relation between adjacent bars is maintained. Alternating current electromotive forces are, of course, generated in the armature windings and a difference of potential exists between any two of the conductors which connect equi-potential points in the windings, consequently if a transformer is connected between any two of these conductors, it will be charged and the potential of all points in the transformer winding will be fixed. Hence, by connecting the transformer as hereinbefore pointed out and connecting the transformer tap to a conductor normally having the same potential, the proper voltage relation between windings and between adjacent commutator bars is maintained.

In Fig. 2 of the drawings, a laminated core member 9 and a commutator 10 are supported in the usual manner upon the spider 11, the core member being provided with slots in which the armature conductors 12 are disposed. The cross connecting conductors $n$, $o$, $p$ and $h$, $i$, $j$ of Fig. 1 are represented in Fig. 2 at 13 and 14, and the transformer 1 is here shown as having a core member 15 and a winding 16 and as supported by the spider 11. It is evident that the transformer or transformers may be of any suitable structure and may be supported by the armature in any manner which is suited to the structural design of the armature. The cross connections 13 and 14 and the transformers will, of course, be located close together at the rear end of the armature in order to make the connections and leads as short as possible.

In Fig. 3, the structure illustrated is similar to that of Fig. 2 except that resistance connections 17 are introduced between the rear end of the armature coils and the commutator bars and are disposed in the bottoms of the core slots. It is evident that the method of maintaining the desired voltage relation between adjacent commutator bars illustrated in Fig. 1 is specially adapted to single-phase alternating current machines in which it is desirable to utilize high-resistance connections between the armature winding and the commutator bars.

In Fig. 4, three windings $x$, $y$ and $z$ are shown diagrammatically instead of two, as in Fig. 1. In this case, the terminals of a transformer 18 are connected to the rear ends of coils 19 and 20 of the winding $y$ and intermediate taps 21 and 22 of the transformer are respectively connected to the rear ends of the coils 23 and 24 of the windings $z$ and $x$. It is obvious that the same arrangement may be applied to any number of windings so that the number of bars may be made practically independent of the characteristics of the machine, which have usually controlled it.

While I have pointed out that my invention is specially adapted for use with certain classes of dynamo-electric machines, such as single-phase alternating current machines of the commutator type and high-speed direct current machines, it may be applied to other types of machines for the purpose of overcoming the difficulties to which reference has been made and for other purposes within the spirit and scope of my invention.

I claim as my invention:

1. A dynamo-electric machine comprising an armature winding, cross connections joining equi-potential points thereof, and independent inductive means for maintaining a predetermined voltage relation between cross connections.

2. A dynamo-electric machine comprising an armature winding having a plurality of similar winding sections and independent inductive means for maintaining a predetermined voltage relation between said winding sections.

3. A dynamo-electric machine comprising an armature core member, a commutator, a plurality of interlaced armature windings alternately connected to successive commutator bars, groups of cross connections between equi-potential points in the respective windings, and means for maintaining a predetermined potential relation between groups of cross-connections of unlike potential.

4. A dynamo-electric machine comprising an armature core member, a commutator, a plurality of interlaced armature windings alternately connected to successive commutator bars, groups of cross connections between equi-potential points in the respective windings, and a transformer having a winding connected to the groups of cross connections for maintaining a predetermined voltage relation between them.

5. An armature for dynamo-electric machines comprising a core member, a commutator, a plurality of similar windings mechanically interlaced and alternately connected to successive commutator bars, and inductive means independent of the armature core member for maintaining a predetermined voltage relation between adjacent commutator bars.

6. A member for dynamo-electric machines comprising a magnetizable core member, a commutator, a plurality of windings associated with the core member and respectively connected to an independent series of spaced commutator bars and inductive means independent of said magnetizable core member for maintaining a predetermined voltage relation between adjacent commutator bars.

7. An armature for dynamo-electric machines comprising a magnetizable core member, a commutator, a plurality of windings mechanically interlaced and connected to commutator bars in progression and transformers having windings interconnecting the armature windings for maintaining a predetermined voltage relation between adjacent commutator bars.

In testimony whereof, I have hereunto subscribed my name this 19th day of Jan., 1910.

BENJ. G. LAMME.

Witnesses:
E. LIVINGSTONE,
B. B. HINES.

Copies of this patent may be obtained for five cents each, by addressing the "Commissioner of Patents, Washington, D. C."